United States Patent
Chun et al.

(10) Patent No.: US 9,789,472 B2
(45) Date of Patent: Oct. 17, 2017

(54) METHOD FOR PREPARING IRON-BASED CATALYST AND IRON-BASED CATALYST PREPARED BY THE SAME

(71) Applicants: Korea Institute of Energy Research, Daejeon (KR); Universidad de Antioquia, Medellin (CO)

(72) Inventors: Dong Hyun Chun, Daejeon (KR); Ji Chan Park, Daejeon (KR); Heon Jung, Daejeon (KR); Fanor Mondragon Pérez, Medellin (CO); María Angélica Forgionny Flórez, Medellín (CO); Ho-Tae Lee, Daejeon (KR); Jung-Il Yang, Daejeon (KR); SungJun Hong, Daejeon (KR)

(73) Assignees: KOREA INSTITUTE OF ENERGY RESEARCH, Deajeon (KR); UNIVERSIDAD DE ANTIOQUIA, Medellin (CO)

( * ) Notice: Subject to any disclaimer, the term of this patent is extended or adjusted under 35 U.S.C. 154(b) by 333 days.

(21) Appl. No.: 14/445,808

(22) Filed: Jul. 29, 2014

(65) Prior Publication Data
US 2015/0080210 A1 Mar. 19, 2015

(30) Foreign Application Priority Data

Jul. 29, 2013 (KR) .................. 10-2013-0089300
Jul. 25, 2014 (KR) .................. 10-2014-0094950

(51) Int. Cl.
*B01J 23/00* (2006.01)
*B01J 21/00* (2006.01)
(Continued)

(52) U.S. Cl.
CPC ........... *B01J 23/78* (2013.01); *B01J 23/8892* (2013.01); *B01J 35/002* (2013.01);
(Continued)

(58) Field of Classification Search
CPC ...... B01J 23/78; B01J 35/002; B01J 23/8892; B01J 35/1061; B01J 37/343;
(Continued)

(56) References Cited

U.S. PATENT DOCUMENTS

| 4,379,078 A * | 4/1983 | Lytkin | ........... B01J 23/745 423/362 |
| 5,663,425 A * | 9/1997 | Detroit | ........... C05F 11/02 562/32 |

(Continued)

FOREIGN PATENT DOCUMENTS

| KR | 10-2009-0070578 A | 7/2009 | |
| KR | 2012-0054477 A | 5/2012 | |
| KR | WO 2012067291 A1 * | 5/2012 | .............. B01J 23/75 |

OTHER PUBLICATIONS

Muwanguzi et al. "Characterization of Chemical Composition and Microstructure of Natural Iron Ore from Muko Deposits" ISRN Materials Science, vol. 2012 (2012), Article ID 174803, pp. 1-9, Oct. 24, 2012.*

*Primary Examiner* — Haytham Soliman
(74) *Attorney, Agent, or Firm* — Saliwanchik, Lloyd & Eisenschenk

(57) ABSTRACT

A method for preparing an iron-based catalyst, the method including preparing iron ore particles by grinding iron ore; and impregnating the iron ore particles with a first metal and second metal, wherein the first metal is selected from copper, cobalt, or manganese, or a combination thereof, and the second metal is selected from an alkali metal or alkali earth metal, or a combination thereof.

17 Claims, 5 Drawing Sheets

(51) Int. Cl.
*C01C 1/04* (2006.01)
*B01J 23/78* (2006.01)
*B01J 37/34* (2006.01)
*B01J 23/889* (2006.01)
*B01J 35/00* (2006.01)
*B01J 35/10* (2006.01)
*B01J 37/00* (2006.01)
*C10G 2/00* (2006.01)
*B01J 35/02* (2006.01)

(52) U.S. Cl.
CPC ....... *B01J 35/1014* (2013.01); *B01J 35/1019* (2013.01); *B01J 35/1038* (2013.01); *B01J 35/1061* (2013.01); *B01J 37/0036* (2013.01); *B01J 37/343* (2013.01); *C10G 2/332* (2013.01); *B01J 35/023* (2013.01)

(58) Field of Classification Search
CPC ................ B01J 37/0036; B01J 35/1019; B01J 35/1038; B01J 35/1014; B01J 35/023; C10G 2/332
USPC ................ 502/325; 252/466, 472, 473, 474; 423/362
See application file for complete search history.

(56) References Cited

U.S. PATENT DOCUMENTS

2003/0003035 A1* 1/2003 Stamires .................. B01J 19/10
          422/225
2013/0237410 A1* 9/2013 Chun ....................... B01J 23/75
          502/245

* cited by examiner

METHOD FOR PREPARING IRON-BASED CATALYST AND IRON-BASED CATALYST PREPARED BY THE SAME

CROSS-REFERENCE TO RELATED APPLICATION

This application claims the benefit of priority under 35 U.S.C. §119(a) of Korean Patent Applications No. 10-2013-0089300, and No. 10-2014-0094950, filed on Jul. 29, 2013, and Jul. 25, 2014, respectively, in the Korean Intellectual Property Office, the entire disclosure of which is incorporated herein by reference for all purposes.

FIELD

Various embodiments of the present invention relate to a method for preparing an iron-based catalyst and an iron-based catalyst prepared by the same, and more particularly to an economical and environment-friendly method for preparing an iron-based catalyst directly from iron ore, thereby realizing a stable iron-based catalyst exhibiting excellent catalyst performance, and an iron-based catalyst prepared by the same.

BACKGROUND

An iron composite may exhibit activity to living radical polymerization. Iron is a low price metal that is abundant on earth, and due to its high level of stability, it is an important metal in putting living radical polymerization to practical use.

Conventional iron-based catalysts have been prepared in various methods. A method used by Fischer in early stages is the iron-tuning method. Catalysts prepared by this method are characterized to generate a lot of liquid products of compounds combined with oxygen under high pressures, and a lot of carbohydrate compounds under low pressures. However, the method also has a disadvantage of accelerating inactivation, thereby decreasing the productivity.

Another method is preparing an iron-based catalyst by a precipitation method through a process of obtaining slurry by reacting a base with iron nitrate. Such a method exhibits excellent reaction activity of Fischer-Tropsch synthesis. However, in this method, numerous processes have been added to increase the performance of the catalyst, making the process of preparing the catalyst more complicated. Not only that, it requires a washing process using a lot of distilled water to remove residue, thus causing a problem of environmental pollution.

There are other methods for preparing an iron-based catalyst: impregnating methods and melting methods, but catalysts prepared in these methods are disadvantageous in that they mostly have a formula of $Fe_3O_4$ (magnetite), and an extremely low specific surface area.

Thus, there has been a need to improve the process of preparing an iron-based catalyst such that the most important performances of an iron-based catalyst can be realized at low cost: excellent indexes such as CO conversion ratio and selectivity of C5+ hydrocarbon and improved productivity.

SUMMARY

Therefore, a purpose of various embodiments of the present invention is to resolve the aforementioned problems of prior art, that is to provide a method for preparing an iron-based catalyst directly using as raw material iron ore that is commonplace on earth.

Another purpose is to reduce the amount of usage of nitrate so that the iron-based catalyst can be environmentally-friendly.

Another purpose is to simplify the process of preparing an iron-based catalyst wherein a process of washing the catalyst is not necessary due to the reduced amount of usage of nitrate and carbonate, a less amount of chemical pollutants is discharged, almost no distilled water is used since there is no washing process, and saves cost as well.

Another purpose is to have iron ore as raw material, mix a material for promoting reduction and a material for promoting alkalinity by an optimal ratio, thereby preparing an iron-based catalyst with significantly increased reactivity in the synthesizing reaction.

Another purpose is to prepare an iron-based catalyst with excellent performance due to significantly improved CO conversion ratio and $C_{5+}$ selectivity compared to prior art.

According to an embodiment of the present invention, there is provided a method for preparing an iron-based catalyst, the method including preparing iron ore particles by grinding iron ore; and impregnating the iron ore particles with a first metal and second metal, wherein the first metal is selected from copper, cobalt, or manganese, or a combination thereof, and the second metal is selected from an alkali metal or alkali earth metal, or a combination thereof.

The preparing of iron ore particles may include coarse-grinding the iron ore to have an average particle size of 0.1 µm to 2 cm; and fine-grinding the iron ore to have an average particle size of 10 nm to 10 µm.

At the coarse-grinding, the iron ore may be ground 1 to 5 times by a method selected from a jaw crusher, roll crusher, or ball mill, or a combination thereof.

At the fine-grinding, the iron ore may be ground 1 to 3 times by a method selected from a jet mill, bead mill, or apex, or a combination thereof.

The fine-grinding may include first fine-grinding wherein the iron ore ground at the coarse-grinding is dry-ground; and second fine-grinding wherein a solvent is mixed to the dry-ground iron ore and then the dry-ground iron ore is wet-ground.

At the second fine-grinding, the iron ore may be 1 to 20 weight % per 100 weight % of the iron ore and solvent.

The second fine-grinding may be performed by a bead mill or apex mill method using a bead having a diameter of 0.05 to 0.3 mm.

The second fine-grinding may be performed for 30 minutes to 4 hours.

A surface area of an iron ore particle may be 35 to 300 $m^2/g$.

An iron ore particle may further include aluminum (Al) or silicon (Si), or both.

According to another embodiment of the present invention, there is provided a method for preparing an iron-based catalyst, the method including preparing iron ore particles by grinding iron ore; forming a mixture of the iron ore particles, a first solution comprising a first metal or a salt thereof, a second solution comprising a second metal or a salt thereof; drying the mixture to prepare a solid matter; and calcining the solid matter, wherein the first metal is selected from copper, cobalt, or manganese, or a combination thereof, and the second metal is selected from an alkali metal or alkali earth metal, or a combination thereof.

The preparing of iron ore particles may include coarse-grinding the iron ore to have an average particle size of 0.1 µm to 2 cm; first fine-grinding wherein the coarse-ground iron ore is dry-ground; and second fine-grinding wherein a solvent is mixed to the dry-ground iron ore and then the dry-ground iron ore is wet-ground.

An iron ore particle may have a diameter of 10 nm to 10 μm, and a surface area of 20 to 300 m²/g.

The metal contained in the first solution and second solution may be 1 to 20 parts by weight per 100 parts by weight of iron (Fe) contained in the iron ore.

At the forming of a mixture, an oxide comprising silicon (Si), aluminum (Al), zirconium (Zr), or chrome (Cr), or a combination thereof, or a precursor of the oxide may be further added.

The silicon (Si), aluminum (Al), zirconium (Zr), or chrome (Cr), or a combination thereof may be 1 to 50 parts by weight per 100 parts by weight of iron (Fe) contained in the iron ore particles.

At the forming of a mixture, iron salt may be further added.

The iron contained in the iron salt may be 1 to 50 parts by weight per 100 parts by weight of iron (Fe) contained in the iron ore particles.

At the forming of a mixture, ammonia water may be further added to adjust a pH of the mixture to 7 to 9.

The calcining may involve calcining the solid matter for 1 to 8 hours at a temperature of 300 to 600° C. and at the atmosphere.

According to an embodiment of the present invention, there is provided an iron-based catalyst prepared by the aforementioned method.

A method for preparing an iron-based catalyst according to the aforementioned embodiments of the present invention has iron ore as raw material which is easy to obtain and costs less, and significantly reduces the amount of usage of iron nitrate that has been used in prior art, thereby discharging no pollutants.

Especially, this method may control the substance and size of ground particles of iron ore, thereby further improving the reactivity with a promoter, and may also mix iron, copper, potassium, sodium, and silicon oxide at an optimal rate, thereby improving the reactivity of the synthesizing reaction of the iron-based catalyst.

An iron-based catalyst prepared by this method exhibits a higher CO conversion ratio and selectivity of $C_{5+}$ hydrocarbon, thereby realizing a catalyst of excellent performance that does not lack much performance as prior art.

Furthermore, this method does not require a distilled water washing process, but water molecules can be removed through a drying process. Therefore, the amount of usage of water can be reduced to less than 20%, providing environmentally-friendliness and economic feasibility.

Not only that, this method is more economical since it may significantly reduce the processing cost of iron nitrate and sediment.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinafter, a method for preparing an iron-based catalyst according to an embodiment of the present invention and an iron-based catalyst prepared by the same will be explained in detail.

Figure 1:
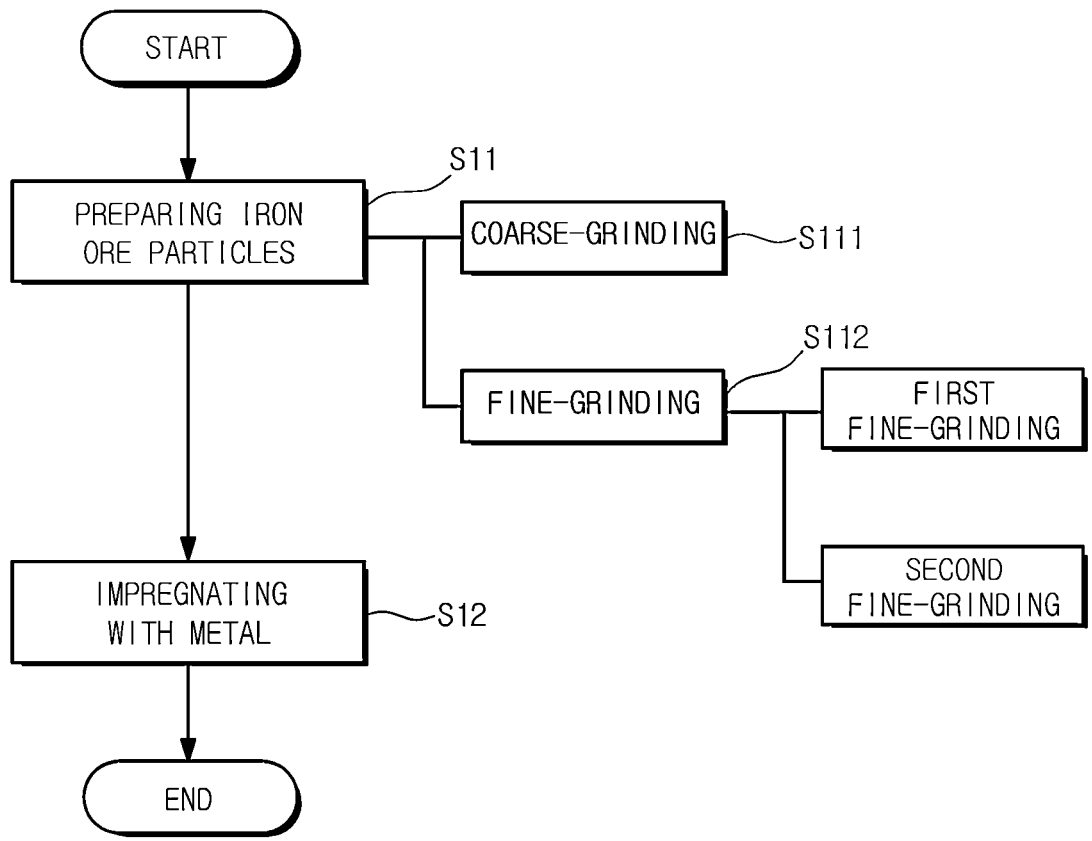
FIG. 1 is a flowchart sequentially illustrating a method for preparing an iron-based catalyst according to an embodiment of the present invention.
Figure 2:
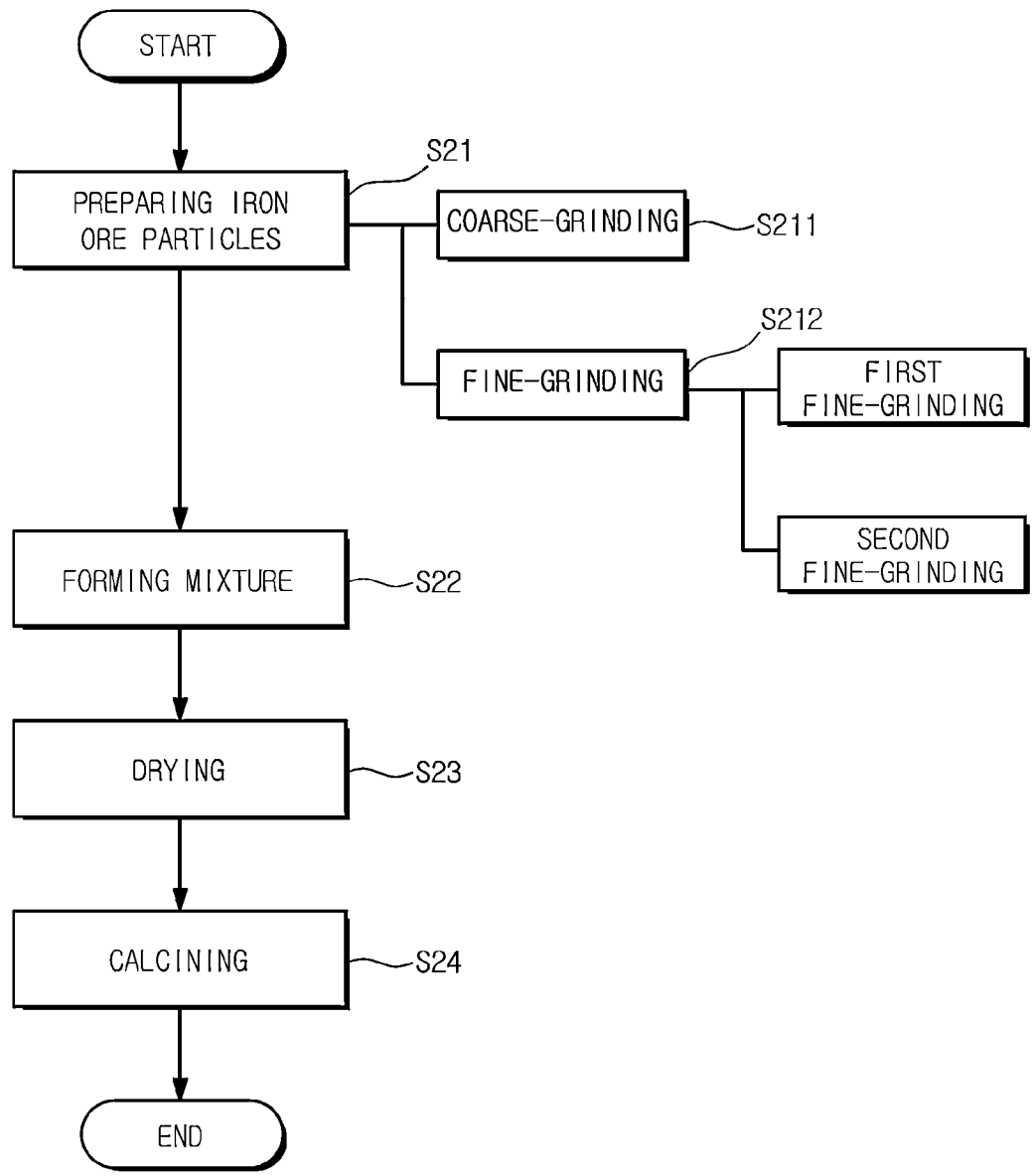
FIG. 2 is a flowchart sequentially illustrating a method for preparing an iron-based catalyst according to another embodiment of the present invention.

The method for preparing an iron-based catalyst according to an embodiment of the present invention includes preparing iron ore particles (S11) and impregnating the iron ore particles with metal (S12), as illustrated in FIG. 1.

The preparing of iron ore particles (S11) is a step of grinding iron ore and preparing iron ore particles.

In this method for preparing an iron-based catalyst according to an embodiment of the present invention, iron ore is directly used as raw material, instead of iron nitrate that has been used in prior art. Herein, any iron ore that can be mined may be used. It may be hematite, magnetite, limonite, or siderite.

The preparing of iron ore particles (S11) may include coarse-grinding (S111) and fine-grinding (S112).

The coarse-grinding (S111) is a step of coarse-grinding the iron ore to have an average diameter of 0.1 μm to 2 cm, and desirably 0.1 μm to 1 cm.

At the coarse-grinding, the iron ore may be ground by a method selected from a jaw crusher, roll crusher, or ball mill, and desirably, the iron ore may be ground numerous times while gradually reducing the diameter of the iron ore, and more desirably, 1 to 5 times. In the case of grinding the iron ore numerous times, a combination of the jaw crusher, roll crusher, and ball mill method may be used.

More specifically, it is possible to grind the iron ore to have an average diameter of 1 to 5 cm using the jaw crusher, an average diameter of 0.1 to 2.0 cm using the roll crusher, an average of 0.1 to 300 μm using the ball mill, or an average diameter of 0.1 to 30 μm using the jet mill. After the grinding, the ground iron ore may be filtered using a sieve having an appropriate mesh, and then the next grinding may be performed.

The fine-grinding (S112) is a step of fine-grinding the iron ore coarse-ground at the coarse-grinding (S111) to have an average diameter of 10 nm to 10 μm, and desirably 10 nm to 5 μm.

A particle of the iron ore ground to have the aforementioned average diameter has a large surface area and thus can be effectively impregnated. If the average diameter of a particle exceeds 10 μm, the effect of impregnating the iron ore with metal will be insignificant, and if the average diameter of a particle is less than 10 nm, it will not be easy to prepare an iron-based catalyst through the grinding process.

At the fine-grinding (S112), the iron ore may be ground by a method selected from a jet mill, bead mill, or apex, and desirably, the iron ore may be ground numerous times while gradually reducing the diameter of the iron ore, and more desirably, 1 to 3 times. In the case of grinding the iron ore numerous times, a combination of the jet mill, bead mill, or apex may be used.

More specifically, the fine-grinding (S112) may be performed through first fine-grinding wherein the iron ore ground by the coarse-grinding is dry-ground; and second fine-grinding wherein a solvent is mixed to the dry-ground iron ore and then the dry-ground iron ore is wet-ground.

At the first fine-grinding, the iron ore may be ground using a jet mill, to have an average diameter of desirably 10 μm or less.

The second fine-grinding may be performed by a bead mill or apex mill method. Using the bead mill or apex mill, a solvent may be added to the coarse-ground iron ore and then wet-ground in a slurry state.

Herein, any generally used solvent may be used, more specifically, distilled water.

Per 100 weight % of the iron ore and solvent, the iron ore may be 1 to 20 weight %, and desirably 5 to 20 weight %. If the iron ore is less than 1 weight % per 100 weight % of the iron ore and solvent, grinding may be performed effectively, but the amount of iron ore particles that can be obtained will be too small compared to the amount of water used, thereby reducing the environmental advantage, and if the iron ore exceeds 20 weight %, the viscosity of the slurry will increase, making it difficult to grind the iron ore to a desired size, and clogging the flow path of the wet-grinding equipment.

The second fine-grinding may be performed for 30 minutes to 4 hours, and desirably for 30 minutes to 2 hours. If the second fine-grinding is performed for less than 30 minutes, the iron ore will not be ground sufficiently, and if the second fine-grinding is performed for over 4 hours, the grinding effect according to increase of time will be insignificant, and fine-ground particles may re-condense with one another.

Beads of various sizes may be used: a bead having a diameter of 0.05 to 0.3 mm. Desirably, the iron ore may be ground gradually using smaller beads, more specifically, the iron ore may be ground using a bead having a diameter of 0.3 mm, followed by a bead having a diameter of 0.2 mm, followed by a bead having a diameter of 0.1 mm, and followed by a bead having a diameter of 0.05 mm. The size of an iron ore particle may be adjusted to an optimal size by performing the wet-grinding while adjusting the size of the bead.

An iron ore particle prepared by grinding the iron ore may have a surface area of 35 to 300 $m^2/g$, and desirably 70 to 300 $m^2/g$. If the surface size of an iron ore particle is less than 35 $m^2/g$, it will be difficult to introduce a promoter, thereby significantly deteriorating the role as a catalyst, and if the surface size of an iron ore particle exceeds 300 $m^2/g$, it will not be easy to prepare an iron-based catalyst through a grinding process.

The iron ore particle may desirably include $FeCO_3$ or $FeO(OH)$. $FeCO_3$ or $FeO(OH)$ may create pores during calcination, and metal may enter the pores and be coupled to the pores, thereby realizing an iron-based catalyst with excellent catalyst performance.

An iron ore particle may further include aluminum (Al) or silicon (Si) or both. In the case where the aluminum and silicon is dispersed evenly in the iron ore, when iron ore particles are impregnated with metal and then calcined, the aluminum and silicon will be oxidized to aluminum oxide ($Al_2O_3$) and silicon oxide ($SiO_2$) particles, respectively, and play the role of a spacer that prevents thermal sintering of the iron-based catalyst.

The metal impregnating (S11) is a step of impregnating iron ore particles with metal. This is a process of preparing an iron-based catalyst by impregnating the iron ore particles with a metal that is capable of playing the role of a promoter.

The metal being impregnated into the iron ore particles at the impregnating with metal (S11) may include a first metal selected from copper, cobalt, or manganese, or a combination thereof, and a second metal selected from an alkali metal or alkali earth metal, or a combination thereof.

The first metal may play the role of a promoter for promoting reduction. The first metal may be 1 to 20 parts by weight per 100 parts by weight of iron included in the iron ore particles. If the metal is less than 1 parts by weight, the effect of improving the catalyst performance will be insignificant, and if the metal exceeds 20 parts by weight, the degree of improvement of the catalyst performances will be not much but reduced.

The second metal may play the role of a promoter of promoting surface alkalinity. The second metal may be 1 to 20 parts by weight per 100 parts by weight of iron included in the iron ore particles. If the metal is less than 1 parts by weight, the effect of improving the catalyst performances will be insignificant, and if the metal exceeds 20 parts by weight, the catalyst performance will be significantly reduced.

The alkali metal may be lithium (Li), sodium (Na), potassium (K), or rubidium (Rb), and the alkali earth metal may be magnesium (Mg), calcium (Ca), strontium (Sr), or barium (Ba). Desirably, an alkali metal may be used, and more desirably, sodium (Na) or potassium (K) may be used.

At the impregnating with metal (S12), iron ore particles may be immersed with metal by impregnating the iron ore particles with metal. More specifically, a spray drying method, evaporation method, incipient wetness method or melt infiltration method may be used, each of which may be applied in the range of a well known technology.

By preparing an iron ore catalyst by impregnating the iron ore particles with metal through the impregnating with metal (S12), and evaporating and removing residue impurities by drying and calcining the same, it is possible to prepare a high-purity catalyst and finally determine a pore structure of the catalyst.

A method for preparing an iron-based catalyst according to another embodiment of the present invention may include preparing iron ore particles (S21), forming a mixture (S22), drying (S23), and calcining (S24).

The preparing of iron ore particles (S21) may include coarse-grinding the iron ore particles to have a diameter of 0.1 μm to 2 cm (S211), and fine-grinding the iron ore particles to have an average diameter of 10 nm to 10 μm (S212).

The fine-grinding (S212) may include first fine-grinding wherein the iron ore is dry-ground, and second fine-grinding wherein a solvent is added and wet-ground.

An iron ore particle may have a diameter of 10 nm to 10 μm, and a surface size of 35 to 300 m²/g.

Besides, a method for preparing iron ore particles is as explained below.

The forming of a mixture (S22) is a step of mixing a first solution including the iron ore particles, the first metal or a salt thereof, and a second solution including the second metal or a salt thereof to form a mixture. This is a process of impregnating the iron ore that is the base of an iron-based catalyst with a promoter for promoting reduction of the first solution and a promoter for promoting improvement of surface alkalinity of the second solution.

At the forming of a mixture (S22), the first solution and second solution may be applied in the form of an aqueous solution, and be mixed with iron ore particles.

The first solution may include copper, cobalt, or manganese, or a combination thereof, and the metal contained in the first solution may play the role of a promoter for promoting reduction.

The salt of the metal salt used in the first solution may be nitrate, acetate, or oxalate, or a combination thereof.

The second solution may include alkali metal or alkali earth metal, or a combination thereof, and the metal contained in the second solution may play the role of a promoter for promoting surface alkalinity.

The alkali metal may be lithium (Li), sodium (Na), potassium (K), or rubidium (Rb), and the alkali earth metal may be magnesium (Mg), calcium (Ca), strontium (Sr), or barium (Ba). Desirably, an alkali metal may be used, and more desirably, sodium or potassium may be used.

The salt of the second solution may be selected from nitrate, carbonate, acetate, or oxalate, or a combination thereof.

The metal contained in the first solution and the second solution may be 1 to 20 parts by weight per 100 parts by weight of iron (Fe) contained in the iron ore particles. If the metal is less than 1 parts by weight, the effect of improving the catalyst performance will be insignificant, and if the metal exceeds 20 parts by weight, the degree of improvement of the catalyst performance will not be much, but significantly reduced.

At the forming of a mixture (S10), an oxide including silicon (Si), aluminum (Al), zirconium (Zr), or chrome (Cr), or a combination thereof, or a precursor of the oxide may be further included, which may function as a structure promoter.

More specifically, the precursor of the silicon oxide may be tetraethylorthosilicate (TEOS), potassium silicate, sodium silicate, colloidal silica, silica gel, or silicon tertraacetate. The precursor of the aluminum oxide may be aluminum acetate. The precursor of the zirconium oxide may be $ZrOCl_2.8H_2O$ or $Zr(SO_4).H_2O$. The precursor of the chrome oxide may be chromium hexacarbonyl.

The structure promoter may be silicon oxide, and the silicon oxide may desirably be power type dry silica. Herein, the dry silica powder may be particles having an average size of desirably 5 nm to 20 nnm, and more desirably 8 nm to 12 nm, and most desirably, 11 nm. If the average size of a dry silica powder particle is less than 5 nm, the coherence of the catalyst and silicon oxide will act too significantly, deteriorating the catalyst performance, and if the average size of dry silica powder particle exceeds 20 nm, the effect of silicon oxide will be insignificant, deteriorating the catalyst performance.

The silicon (Si), aluminum (Al), zirconium (Zr), or chrome (Cr), or a combination thereof may include 1 to 50 parts by weight per 100 parts by weight of iron contained in the iron ore particles.

At the forming of a mixture (S22), iron salt may be further included in the mixture. The iron salt may include iron nitrate, iron acetate, or iron oxalate, or a combination thereof.

The iron contained in the iron salt may be 1 to 50 parts by weight, desirably 10 to 30 parts by weight per 100 parts by weight of iron (Fe) contained in the iron ore particles. If the iron contained in the iron nitrate solution is less than 1 parts by weight or exceeds 50 parts by weight, the catalyst performances of CO conversion ratio and $C_{5+}$ selectivity may be significantly reduced.

At the forming of a mixture (S22), ammonia water may be further added to form the mixture. By adding the ammonia water, a pH of the mixture may be adjusted to 7 to 9. An iron-based catalyst is prepared by drying the mixture formed at the forming of a mixture (S10), wherein if the pH is less than 7 or exceeds 9, it will be difficult to form a mixture form of an iron-based catalyst.

There is no particular order in mixing the iron ore particles, first solution, and second solution. The iron ore particles ground to have an even diameter by the aforementioned method may be mixed with the first solution and the second solution at the same time.

Otherwise, the first solution and an aqueous solution including the iron salt may be mixed, and then an oxide including silicon (Si), aluminum (Al), zirconium (Zr), or chrome (Cr), or a combination thereof, or a precursor including the oxide may be added and mixed therein, and then the second solution may be added to the mixture.

At the forming of a mixture (S22), a sonication may be performed for 1 to 6 hours and then mixed. The sonication may prevent condensation of iron ore particles, facilitating mixing of the iron ore particles and promoters (metal).

The drying (S23) is a step of drying the mixture formed at the forming of a mixture (S22) and preparing a solid matter. This is a process of evaporating water from the mixture prepared in the solution, so as to prepare an iron solid matter containing various impurities.

A vacuum evaporation method or a spray dry method may be used as the drying method.

The vacuum evaporation method is a concentration method using a vacuum evaporator. This method needs a process of grinding the solid matter obtained through the vacuum evaporation again.

The spray dry method may be a general spray dry method, and an inlet temperature may be desirably 200 to 400° C., and an outlet temperature may be desirably 90 to 120° C. The inlet temperature and outlet temperature being outside the aforementioned ranges may cause loss of major substances in the process of drying the iron-based catalyst in a powder form, deteriorating the catalyst performance, and powder may not be dried evenly.

Unlike the vacuum evaporation method, the spray dry method may obtain globular particles without a grinding process, and is thus preferred than the vacuum evaporation method.

The concentration of the solid particles in the mixture may be desirably 100 to 300 g/L, and more desirably 150 to 250 g/L. If the concentration is less than 100 g/L, the particle size of the catalyst obtained will be too small, and thus it can be difficult to apply the catalyst to a slurry bubble column reactor wherein a filter is used, and if the concentration exceeds 300 g/L, the viscosity of the slurry will increase, thereby causing a nozzle to be clogged too frequently in the spray dry process, deteriorating the efficiency of the preparing process.

The calcining (S24) is a step of calcining the solid matter generated at the drying (S23). This is a process of evaporating and removing residue impurities such as carbonate ions and nitrate ions, thereby preparing a high-purity catalyst and finally determining a pore structure of the catalyst.

The calcining (S24) is a process of evaporating impurities, stabilizing the catalyst chemically, and improving the physical strength, and the heat-treatment may desirably be performed at 300 to 600° C. temperature atmosphere.

If the heat-treatment temperature is less than 300° C., impurities may not be sufficiently evaporated and removed, and the effect of improving the physical strength of the catalyst may be insignificant, and if the heat-treatment temperature exceeds 600° C., the pore structure of the catalyst may be dented.

Furthermore, the heat-treatment time may be 1 to 8 hours and desirably 3.5 hours to 4.5 hours. If the heat-treatment time is less than 1 hour, the impurities may not be removed sufficiently, and the effect of improving the physical strength of the catalyst may be insignificant, and if the heat-treatment time exceeds 8 hours, the economic feasibility will deteriorate, and the pore structure of the catalyst will be dented.

A method for preparing an iron-based catalyst according to an embodiment of the present invention directly uses iron ore to prepare a catalyst, and thus a significantly less amount of iron nitrate is used unlike in prior art, and thus it is possible to remove all the impurities with only heat-treatment without an additional washing process. Therefore, a significantly less amount of pollutants may be discharged.

An iron-based catalyst prepared by such a method according to an embodiment of the present invention may be used in F-T(Fischer-Tropsch) synthesis, and especially, in a low temperature F-T synthesis process.

EXAMPLES

Hereinafter, test results for proving excellent effects of a method for preparing an iron-based catalyst according to an embodiment of the present invention are explained.

Embodiment 1

Iron ore is ground using a jaw crusher such that a particle has a diameter of 2~3 cm, and then ground using a roll crusher such that a particle has a diameter of 0.2~1 cm, and then repeatedly coarse-ground and 152 μm sieved for 1 hour using a planetary ball mill filled with alumina balls. The coarse-ground iron ore is then ground for about 20 minutes using a jet mill such that a particle has a diameter of less than 10 μm, and then fine-ground for 2 hours using an ultra apex mill filled with beads thereby preparing iron ore particles. The concentration of iron ore slurry used in the ultra apex mill is 10 wt %. A copper nitrate solution ($Cu(NO_3)_2 \cdot 5H_2O$) and potassium carbonate ($K_2CO_3$) solution are added to the fine-ground iron ore particles to form a mixture. The amount of usage of the copper nitrate and potassium carbonate is adjusted to a mass ratio of Fe:Cu:K=100:5:3. The mixture is then dried at a temperature of 40~60° C. using a rotary vacuum evaporator until moisture is evaporated, and the dried mixture is calcined at 400° C. for 4 hours using a muffle furnace, thereby obtaining an iron-based catalyst.

Embodiment 2

Iron ore particles are prepared in the same way as in embodiment 1. An iron nitrate solution ($Fe(NO_3)_3 \cdot 9H_2O$), copper nitrate ($Cu(NO_3)_2 \cdot 5H_2O$) solution, and potassium carbonate ($K_2CO_3$) solution are added to the fine-ground iron ore particle slurry, to form a mixture. The weight ratio of the iron contained in the iron nitrate solution/iron contained in the iron ore particles is adjusted to 10/100, and the amount of usage of the copper nitrate and potassium carbonate is adjusted to a mass ratio of Fe:Cu:K=100:5:3. The mixture is then dried at a temperature of 40~60° C. using a rotary vacuum evaporator until moisture is evaporated, and the dried mixture is calcined at 400° C. for 4 hours using a muffle furnace, thereby obtaining an iron-based catalyst.

Embodiment 3

Iron ore particles are prepared in the same way as in embodiment 1. A copper nitrate solution ($Cu(NO_3)_2 \cdot 5H_2O$) and potassium carbonate ($K_2CO_3$) solution are added to the fine-ground iron ore particle slurry, and then ammonia water ($NH_4OH$) is added therein until the pH reaches 8, and then sonicated, to form a mixture. The amount of usage of the copper nitrate and potassium carbonate is adjusted to a mass ratio of Fe:Cu:K=100:5:3. The mixture is then dried at a temperature of 40~60° C. using a rotary vacuum evaporator until moisture is evaporated, and the dried mixture is calcined at 400° C. for 4 hours using a muffle furnace, thereby obtaining an iron-based catalyst.

Embodiment 4

Iron ore is ground using a jaw crusher such that a particle has a diameter of 2~3 cm, and then ground using a roll crusher such that a particle has a diameter of 0.2~1 cm, and then repeatedly coarse-ground and 152 μm sieved for 1 hour using a planetary ball mill filled with alumina balls. The coarse-ground iron ore is then ground for about 20 minutes using a jet mill such that a particle has a diameter of less than 10 μm, and then fine-ground for 2 hours using an ultra apex mill filled with beads thereby preparing iron ore particles. The concentration of iron ore slurry used in the ultra apex mill is 20 wt %. A copper nitrate solution ($Cu(NO_3)_2 \cdot 5H_2O$) and potassium carbonate ($K_2CO_3$) solution are added to the fine-ground iron ore particles to form a mixture. The amount of usage of the copper nitrate and potassium carbonate is adjusted to a mass ratio of Fe:Cu:K=100:5:5. The mixture is then dried at a temperature of 40~60° C. using a rotary vacuum evaporator until moisture is evaporated, and the dried mixture is calcined at 400° C. for 4 hours using a muffle furnace, thereby obtaining an iron-based catalyst.

Embodiment 5

Iron ore is ground using a jaw crusher such that a particle has a diameter of 2~3 cm, and then ground using a roll crusher such that a particle has a diameter of 0.2~1 cm, and then repeatedly ground and 152 μm sieved for 1 hour using a planetary ball mill filled with alumina balls. The coarse-ground iron ore is then fine-ground for about 2 hours using an ultra apex mill filled with yttrium oxide stabilization zirconium oxide beads having a diameter of 0.3 mm, thereby preparing iron ore particles. The concentration of iron ore slurry used in the ultra apex mill is 10 wt %. A silica colloid suspension (average diameter of a silica particle: 11 nm), copper nitrate ($Cu(NO_3)_2 \cdot 5H_2O$) solution, and potassium carbonate ($K_2CO_3$) solution are added to the fine-ground iron ore particle slurry, ammonia water ($NH_4OH$) is added until the pH reaches 8, and then sonicated for about 3 hours, thereby forming a mixture. The amount of usage of the copper nitrate and potassium carbonate is adjusted to a mass ratio of Fe:Cu:K=100:5:3. The mixture is then dried at a temperature of 40~60° C. using a rotary vacuum evaporator until moisture is evaporated, and the dried mixture is calcined at 400° C. for 4 hours using a muffle furnace, thereby obtaining an iron-based catalyst.

Embodiment 6

Iron ore particles are prepared in the same way as in embodiment 5. A silica colloid suspension (average diameter of a silica particle: 11 nm), iron nitrate ($Fe(NO_3)_3 \cdot 9H_2O$) solution, copper nitrate ($Cu(NO_3)_2 \cdot 5H_2O$) solution, and potassium carbonate ($K_2CO_3$) solution are added to the fine-ground iron ore particle slurry, ammonia water ($NH_4OH$) is added until the pH reaches 8, and then sonicated for about 3 hours, thereby forming a mixture. The weight ratio of the iron contained in the iron nitrate solution/iron contained in the iron ore particles is adjusted to 10/100, and the amount of usage of the copper nitrate and potassium carbonate is adjusted to a mass ratio of Fe:Cu:K=100:5:3. The mixture is then dried at a temperature of 40~60° C. using a rotary vacuum evaporator until moisture is evaporated, and the dried mixture is calcined at 400° C. for 4 hours using a muffle furnace, thereby obtaining an iron-based catalyst.

Embodiment 7

Iron ore particles are prepared in the same way as in embodiment 5. A silica colloid suspension (average diameter of a silica particle: 11 nm), iron nitrate ($Fe(NO_3)_3 \cdot 9H_2O$) solution, copper nitrate ($Cu(NO_3)_2 \cdot 5H_2O$) solution, and potassium carbonate ($K_2CO_3$) solution are added to the fine-ground iron ore particle slurry, ammonia water ($NH_4OH$) is added until the pH reaches 8, and then sonicated for about 3 hours, thereby forming a mixture. The weight ratio of the iron contained in the iron nitrate solution/the iron contained in the iron ore particles is adjusted to 5/100, and the amount of usage of the copper nitrate and potassium carbonate is adjusted to a mass ratio of Fe:Cu:K=100:5:3. The mixture is then dried at a temperature of 40~60° C. using a rotary vacuum evaporator until moisture is evaporated, and the dried mixture is calcined at 400° C. for 4 hours using a muffle furnace, thereby obtaining an iron-based catalyst.

Comparative Example 1

Iron ore is ground using a jaw crusher such that a particle has a diameter of 2~3 cm, and then ground using a roll crusher such that a particle has a diameter of 0.2~1 cm, and then repeatedly coarse-ground and 152 μm sieved for 1 hour using a planetary ball mill filled with alumina balls, thereby obtaining an iron-based catalyst.

Comparative Example 2

Iron ore is ground using a jaw crusher such that a particle has a diameter of 2~3 cm, and then ground using a roll crusher such that a particle has a diameter of 0.2~1 cm, and then repeatedly coarse-ground and 152 μm sieved for 1 hour using a planetary ball mill filled with alumina balls, and lastly ground for about 20 minutes using a jet mill such that a particle has a diameter of less than 10 μm, thereby obtaining an iron-based catalyst.

Comparative Example 3

Iron ore particles are ground in the same way as in comparative example 1, and then calcined at about 400° C. for about 4 hours using a muffle furnace, thereby obtaining an iron-based catalyst.

Comparative Example 4

Iron ore is ground using a jaw crusher such that a particle has a diameter of 2~3 cm, and then ground using a roll crusher such that a particle has a diameter of 0.2~1 cm, and then repeatedly coarse-ground and 152 μm sieved for 1 hour using a planetary ball mill filled with alumina balls. The coarse-ground iron ore is ground for about 20 minutes using a jet mill such that a particle has a diameter of less than 10 μm, and then fie-ground for about 2 hours using an ultra apex mill filled with yttrium oxide stabilization zirconium oxide beads having a diameter of 0.3 mm, thereby preparing iron ore particles. The prepared iron ore particles are calcined at 400° C. for 4 hours using a muffle furnace, thereby obtaining an iron-based catalyst.

Comparative Example 5

An iron nitrate solution ($Fe(NO_3)_3 \cdot 9H_2O$) and a copper nitrate solution ($Cu(NO_3)_2 \cdot 5H_2O$) are mixed to prepare a mixture solution, and then a sodium carbonate solution ($Na_2CO_3$) is added to the mixture solution to form a precipitated slurry, and the precipitated slurry is filtered and washed using distilled water. A silicon oxide ($SiO_2$) and a potassium carbonate solution ($K_2CO_3$) are added to the washed precipitated slurry, and then the washed precipitated slurry is dried by a spray dry method, and then the dried precipitated slurry is calcined at 400° C. using a muffle furnace for about 8 hours, thereby obtaining an iron-based catalyst.

Amounts of nitrate, carbonate, and distilled water used in preparing an iron-based catalyst in the methods of embodiments 1 to 7 and comparative example 5 were measured are disclosed in table 1 below. The measured amounts are disclosed based on the weight of the iron-based catalyst prepared ($g_{(cat)}$).

TABLE 1

|  |  | Amount of nitrate used ($g/g_{(cat)}$) | Amount of carbonate used ($g/g_{(cat)}$) | Amount of distilled water used ($ml/g_{(cat)}$) |
|---|---|---|---|---|
| Embodiments | 1 | 0.123 | 0.037 | 16.7 |
|  | 2 | 0.779 | 0.047 | 28.0 |
|  | 3 | 0.161 | 0.048 | 22.2 |
|  | 4 | 0.098 | 0.059 | 13.4 |
|  | 5 | 0.090 | 0.027 | 23.6 |
|  | 6 | 0.525 | 0.032 | 31.6 |
|  | 7 | 0.364 | 0.037 | 34.5 |
| Comparative examples | 5 | 4.16 | 1.91 | 225 |

From table 1 above, one can see that the amounts of nitrate, carbonate, and distilled water may all be reduced in the case of an iron-based catalyst prepared in methods of embodiments 1 to 7.

In the method of embodiment 5, the amount of usage of nitrate is 2.2%, which stands comparison to a conventional method for preparing an iron-based catalyst of comparative example 5, and even in the case of embodiment 2 having the largest amount of usage of nitrate, the amount of usage of nitrate is 18.8% which stands comparison to comparative example 5.

The amount of usage of carbonate is 1.0 (embodiment 5) to 2.5% (embodiment 3) which stand comparison to the amount of usage of carbonate used in the method of comparative example 5.

Furthermore, the amount of usage of distilled water is just 6.0 (embodiment 4) to 15.3 (embodiment 7), which stand comparison to the amount of usage of distilled water used in the method of comparative example 5.

That is, a method for preparing an iron-based catalyst according to an embodiment of the present invention is capable of reducing the amount of usage of nitrate, carbonate, and distilled water to 97%, 99%, and 94% than comparative example 5 of comparative example 5 by a conventional precipitation method, and is thus environmentally friendly and economically feasible.

The specific surface area, pore volume, and average pore size of an iron-based catalyst were measured to observe the pore structure of an iron-based catalyst prepared by methods of embodiments 1 to 7 and comparative examples 1 to 2.

TABLE 2

|  |  | Specific surface area ($m^2/g$) | Pore volume ($cm^3/g$) | Average pore size (nm) |
|---|---|---|---|---|
| Embodiments | 1 | 78.2 | 0.304 | 15.6 |
|  | 2 | 83.6 | 0.155 | 7.41 |
|  | 3 | 82.4 | 0.358 | 17.4 |
|  | 4 | 110 | 0.336 | 12.2 |
|  | 5 | 120 | 0.490 | 16.3 |
|  | 6 | 134 | 0.442 | 13.2 |
|  | 7 | 127 | 0.461 | 14.6 |
| Comparative examples | 1 | 21.7 | 0.067 | 12.4 |
|  | 2 | 34.7 | 0.099 | 11.4 |

It can be seen from table 2 above that an iron-based catalyst prepared by methods of embodiments 1 to 7 may have excellent performances of specific surface area and pore volume.

In the case of preparing an iron-based catalyst through a method according to an embodiment of the present invention, it is possible to obtain a catalyst having a specific surface area of 78 $m^2/g$ or more, thereby increasing the specific surface area by 3.6 to 6.2 times than that of an iron-based catalyst prepared by comparative examples.

The pore volume may also be increased by 2.3 to 7.3 times than that of comparative examples, and thus it is possible to expect that an iron-based catalyst prepared by the embodiments can realize excellent catalyst functions.

Especially, it can be see that the specific surface area can be increased further by adding an iron nitrate solution, ammonia water or silica besides the first solution and second solution.

Performances of an iron-based catalyst prepared by a method of embodiments 1 to 4 and comparative examples 1 and 5 were measured and disclosed in table 3. The catalyst performances measured include CO conversion ratio, $CO_2$ selectivity, hydrocarbon selectivity, and hydrocarbon productivity. Reduction conditions are: 280° C. of temperature, normal pressure, gas type: CO, fluid velocity of CO gas: $1.4NL_{(CO)}/g_{(cat)}$-h, 20 hours of time, 275° C. of F-T synthesizing reaction condition, 1.5 MPa of pressure, gas type: $H_2+CO(H_2/CO=1)$, and fluid velocity of $(H_2+CO)=2.8NL_{(H2+CO)}/g_{(cat)}$-h.

TABLE 3

|  |  | Embodiments | | | | Comparative examples | |
|---|---|---|---|---|---|---|---|
|  |  | 1 | 2 | 3 | 4 | 1 | 5 |
| Time interval (h) | | 114-234 | 114-234 | 114-234 | 114-234 | 114-234 | 114-234 |
| CO conversion ratio (%) | | 74.8 | 80.7 | 76.2 | 86.3 | 33.7 | 79.9 |
| $CO_2$ selectivity (C-mol %) | | 41.9 | 41.7 | 41.5 | 43.2 | 28.2 | 42.8 |
| Hydrocarbon selectivity (wt %) | $CH_4$ | 19.1 | 17.5 | 19.8 | 17.4 | 19.6 | 12.2 |
|  | $C_2$-$C_4$ | 34.1 | 29.8 | 33.7 | 30.4 | 34.2 | 30.6 |
|  | $C_{5+}$ | 46.8 | 52.7 | 46.5 | 52.2 | 46.2 | 57.2 |
| (productivity) ($g/g_{(cat)}$-h) | Total hydrocarbon | 0.328 | 0.353 | 0.331 | 0.374 | 0.186 | 0.357 |
|  | $C_{5+}$ | 0.154 | 0.186 | 0.154 | 0.195 | 0.086 | 0.204 |
|  | $C_5$-$C_{18}$ | 0.132 | 0.156 | 0.132 | 0.164 | 0.066 | 0.141 |
|  | $C_{19+}$ | 0.021 | 0.03 | 0.02 | 0.031 | 0.02 | 0.06 |

From table 3 above, it can be seen that an iron-based catalyst prepared by embodiments 1 to 4 have an excellent CO conversion ratio and hydrocarbon productivity.

An iron-based catalyst prepared by a method of the embodiments may have a CO conversion ratio increased by 2.2 to 2.4 times than that of comparative example 1, and a $C_{5+}$ hydrocarbon productivity increased by 1.8 to 2.6 times than that of comparative example 1.

Furthermore, an iron-based catalyst prepared by a method according to an embodiment of the present invention has no difference in catalyst performance compared to comparative example 5 of a method using a conventional precipitation method in terms of CO conversion ratio and $C_{5+}$ hydrocarbon productivity. Especially, in the case of the productivity of $C_5$-$C_{18}$ hydrocarbon (gasoline, diesel) that is a fuel range for transportation, the catalyst performance measured was similar or excellent.

The CO conversion ratio and hydrocarbon productivity were even more excellent when an iron nitrated was added besides the first solution and second solution at the mixing step, or when the amount of copper and potassium added was a mass ratio of Fe:Cu:K=100:5:5.

Performances of an iron-based catalyst prepared by methods of embodiments 2, 5, and 6 and comparative example 1 were measured and disclosed in table 4 below. The catalyst performances measured included CO conversion ratio, $CO_2$ selectivity, hydrocarbon selectivity, and hydrocarbon productivity. Reduction conditions were 280° C. temperature, normal pressure, gas type: $H_2+CO(H_2/CO=1)$, fluid velocity of $H_2+CO$ gas: $2.8NL_{(H2+CO)}/g_{(cat)}$-h, 20 hours of time, 275° C. of F-T synthesizing reaction condition, 1.5 MPa of pressure, gas type: $H_2+CO(H_2/CO=1)$, and fluid velocity of $(H_2+CO)=2.8NL_{(H2+CO)}/g_{(cat)}$-h.

TABLE 4

|  |  | Embodiments | | | Comparative example |
|---|---|---|---|---|---|
|  |  | 2 | 5 | 6 | 1 |
| Time interval (h) | | 114-234 | 114-234 | 114-234 | 96-192 |
| CO conversion ratio (%) | | 57.2 | 40.9 | 46.2 | 24.7 |
| $CO_2$ selectivity (C-mol %) | | 41.7 | 33.4 | 33.1 | 36.2 |
| Hydro-carbon selectivity (wt %) | $CH_4$ | 19.8 | 22.7 | 18.5 | 12.9 |
| | $C_2$-$C_4$ | 34.1 | 33.2 | 28.6 | 32.3 |
| | $C_{5+}$ | 46.1 | 44.1 | 52.9 | 54.8 |
| Total productivity ($g/g_{(cat)}$-h) | Total hydrocarbon | 0.261 | 0.204 | 0.237 | 0.147 |
| | $C_{5+}$ | 0.120 | 0.090 | 0.125 | 0.081 |
| | $C_5$-$C_{18}$ | 0.101 | 0.070 | 0.094 | 0.052 |
| | $C_{19+}$ | 0.019 | 0.020 | 0.030 | 0.028 |

It can be seen from table 4 that an iron-based catalyst prepared by embodiments 2, 5, and 6 have excellent CO conversion ratio and hydrocarbon productivity.

An iron-based catalyst prepared by embodiments 2, 5, and 6 may have a CO conversion ratio increased by 1.7 to 2.1 times than that of an iron-based catalyst of comparative example 1, and the productivity of $C_5$-$C_{18}$ hydrocarbon (gasoline, diesel) increased by 1.3 to 1.9 times than that of comparative example 1.

That is, it can be seen from tables 3 and 4 above that a method for preparing an iron-based catalyst according to an embodiment of the present invention is capable of saving the amount of usage of nitrate, carbonate, and distilled water to about 95%, while preparing an environmentally friendly catalyst exhibiting catalyst performances of prior art.

Figure 3:
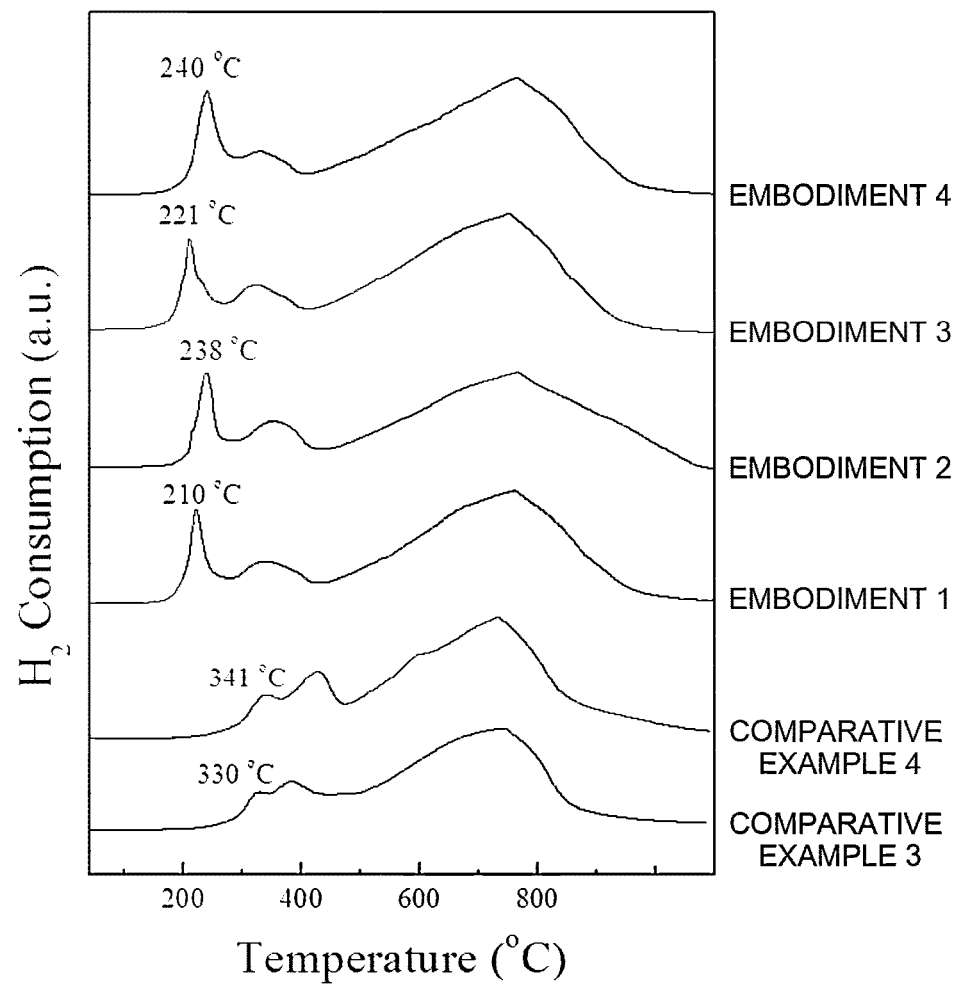
FIG. 3 is a graph of measurements of $H_2$ consumption as a function of temperature of an iron-based catalyst prepared by embodiments 1 to 4 and comparative examples 3 and 4.

To evaluate the reducing power of an iron-based catalyst prepared by embodiments 1 to 4 and comparative examples 3 and 4, $H_2$ consumption as a function of temperature was measured and illustrated in FIG. 3.

It can be seen that an iron-based catalyst prepared by embodiments 1 to 4 of the present invention is capable of significantly increasing the reducing power of an iron ore when compared to the iron-based catalyst of comparative example 3 wherein iron ore is coarse-ground and simply calcined, and the iron-based catalyst of comparative example 4 wherein iron ore is ground and then calcined without adding a promoter.

Furthermore, reduction peak temperatures of embodiments 1 to 4 were in a range of 210 to 240° C., and thus the reduction peak temperature can be lowered to about 240° C. or below.

Figure 4:
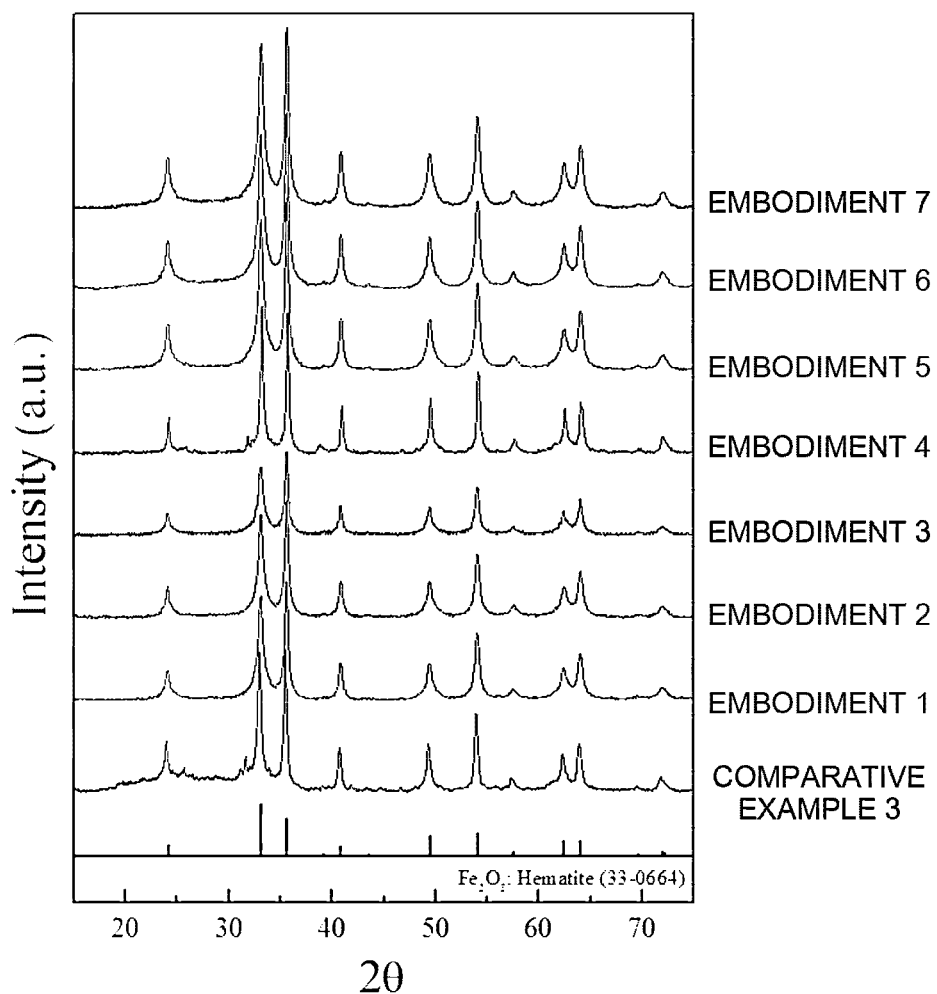
FIG. 4 is an XRD (X-ray diffraction) graph of a crystal structure of an iron-based catalyst prepared by embodiments 1 to 7.

The crystal structure of an iron-based catalyst prepared by a method of embodiments 1 to 7 was analyzed by XRD (X-ray diffraction) and the results illustrated in FIG. 4. It can be seen that an iron-based catalyst prepared by a method of embodiments 1 to 7 contain $Fe_2O_3$(hematite) as a main phase.

The size of a crystal grain of an iron-based catalyst prepared by a method of embodiments 1 to 7 and comparative example 3 was measured based on the X-ray diffraction results, and disclosed in table 5 below.

TABLE 5

| | | Average crystal grain size (nm) |
|---|---|---|
| Embodiments | 1 | 14.4 |
| | 2 | 14.2 |
| | 3 | 13.9 |
| | 4 | 14.7 |
| | 5 | 18.8 |
| | 6 | 17.9 |
| | 7 | 18.4 |
| Comparative examples | 3 | 24.9 |

It can be seen from table 5 that the size of a crystal grain of an iron-based catalyst prepared by a method of embodiments 1 to 7 measured is smaller than that of an iron-based catalyst prepared by comparative example 3, which means that an iron-based catalyst prepared by a method of embodiments 1 to 7 has more active sites than an iron-based catalyst prepared by a method of comparative example 3, thereby exhibiting excellent catalyst performances.

An iron-based catalyst prepared by a method of embodiments 1 to 7 may have the size of a crystal grain reduced to 56 to 77% than that of an iron-based catalyst prepared by a method of comparative example 3 of simply calcining ground iron ore.

Such an effect appeared to be more excellent when iron ore is ground using a jet mill and an ultra apex mill sequentially (embodiments 1, 2, 3, and 4).

Figure 5:
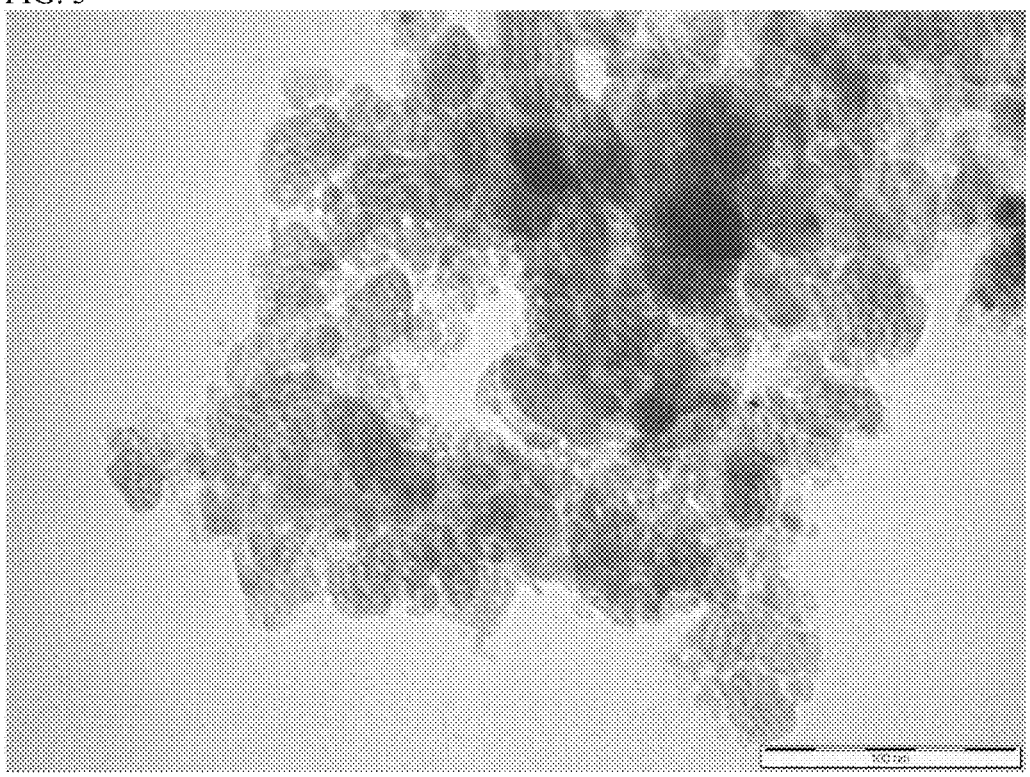
FIG. 5 is a transmitted electronic microscopic image of an iron-based catalyst prepared by a method according to an embodiment of the present invention.

FIG. 5 is a transmitted electronic microscopic image of an iron-based catalyst prepared by a method according to an embodiment of the present invention. As illustrated in FIG. 5, a prepared iron-based catalyst has a nano unit size.

Furthermore, it is observed to have a spared structure, which enables promoters(metal) to be easily impregnated in iron ore when preparing an iron-based catalyst, thereby maximizing the role of promoters.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A method for preparing an iron-based catalyst for Fischer-Tropsch synthesis, the method comprising:
   preparing iron ore particles by coarse-grinding the iron ore and fine-grinding the iron ore ground by the coarse-grinding, wherein the fine-grinding comprises first fine-grinding the iron ore ground by the coarse-grinding in a dry-ground process, and second fine-grinding where a solvent is mixed with the dry-ground iron ore and then the dry-ground iron ore is wet-ground, wherein at the second fine-grinding, the iron ore is 1 to 20 weight % of the iron ore and solvent, and wherein a surface area of the iron ore particles is 35 to 300 $m^2/g$; and
   impregnating the iron ore particles with a first metal and second metal,
   wherein the first metal is selected from copper, cobalt, or manganese, or a combination thereof, and the second metal is selected from an alkali metal or alkali earth metal, or a combination thereof.

2. The method according to claim 1,
   wherein at the
   coarse-grinding, the iron ore is ground to have an average particle size of 0.1 μm to 2 cm; and
   at the fine-grinding, the iron ore is ground to have an average particle size of 10 nm to 10 μm.

3. The method according to claim 1,
wherein at the coarse-grinding, the iron ore is ground 1 to 5 times by a method selected from a jaw crusher, roll crusher, or ball mill, or a combination thereof.

4. The method according to claim 1,
wherein at the fine-grinding, the iron ore is ground by a method selected from a jet mill, bead mill, or apex, or a combination thereof.

5. The method according to claim 1,
wherein the second fine-grinding is performed by a bead mill or apex mill method using a bead having a diameter of 0.05 to 0.3 mm.

6. The method according to claim 1,
wherein the second fine-grinding is performed for 30 minutes to 4 hours.

7. The method according to claim 1,
wherein an iron ore particle further includes aluminum (Al) or silicon (Si), or both.

8. A method for preparing an iron-based catalyst for Fischer-Tropsch synthesis, the method comprising:
preparing iron ore particles by coarse-grinding the iron ore and fine-grinding the iron ore ground by the coarse-grinding, wherein the fine-grinding comprises first fine-grinding the iron ore ground by the coarse-grinding in a dry-grounding process, and second fine-grinding where a solvent is mixed with the dry-ground iron ore and then the dry-ground iron ore is wet-ground, wherein at the second fine-grinding, the iron ore is 1 to 20 weight % of the iron ore and the solvent, and wherein a surface area of the iron ore particles is 35 to 300 m$^2$/g;
forming a mixture of the iron ore particles, a first solution comprising a first metal or a salt thereof, a second solution comprising a second metal or a salt thereof;
drying the mixture to prepare a solid matter; and
calcining the solid matter,
wherein the first metal is selected from copper, cobalt, or manganese, or a combination thereof, and the second metal is selected from an alkali metal or alkali earth metal, or a combination thereof.

9. The method according to claim 8,
wherein at the
coarse-grinding, the iron ore is ground to have an average particle size of 0.1 μm to 2 cm; and
at the fine-grinding, the iron ore is ground to have an average particle size of 10 nm to 10 μm.

10. The method according to claim 8,
wherein an iron ore particle has a diameter of 10 nm to 10 μm.

11. The method according to claim 8,
wherein the metal contained in the first solution and second solution is 1 to 20 parts by weight per 100 parts by weight of iron (Fe) contained in the iron ore.

12. The method according to claim 8,
wherein at the forming of a mixture, an oxide comprising silicon (Si), aluminum (Al), zirconium (Zr), or chrome (Cr), or a combination thereof, or a precursor thereof is further added.

13. The method according to claim 12,
wherein the silicon (Si), aluminum (Al), zirconium (Zr), or chrome (Cr), or a combination thereof is 1 to 50 parts by weight per 100 parts by weight of iron (Fe) contained in the iron ore particles.

14. The method according to claim 8,
wherein at the forming of a mixture, iron salt is further added.

15. The method according to claim 14,
wherein the iron contained in the iron salt is 1 to 50 parts by weight per 100 parts by weight of iron (Fe) contained in the iron ore particles.

16. The method according to claim 8,
wherein at the forming of a mixture, ammonia water is further added to adjust a pH of the mixture to 7 to 9.

17. The method according to claim 8,
wherein the calcining involves calcining the solid matter for 1 to 8 hours at a temperature of 300 to 600° C. and at the atmosphere.

* * * * *